United States Patent Office

3,431,235
Patented Mar. 4, 1969

3,431,235
POLYDIENE RESINS INCLUDING CYCLIZED POLYDIENE RESINS, METHOD OF MANUFACTURE AND USES
Hyman R. Lubowitz, Redondo Beach, Calif., assignor to TRW Inc., Redondo Beach, Calif., a corporation of Ohio
No Drawing. Continuation-in-part of application 499,028, Oct. 20, 1965. This application Mar. 2, 1966, Ser. No. 531,026
U.S. Cl. 260—47          13 Claims
Int. Cl. C08g 33/10, 33/02, 30/00

ABSTRACT OF THE DISCLOSURE

The present invention relates to a method of making hard polydiene resins and the products thereof. In particular a polydiene resin, such as dihydroxyl terminated 1,2-polybutadiene, is reacted at room temperature with an organic chain extender, such as 2,4-toluene diisocyanate, in the presence of a peroxide free radical initiator, such as dicumyl peroxide, whereby a stable elastomeric material having the peroxide molecularly dispersed therethrough is produced. At a subsequent period of time, the elastomeric material can be exposed to elevated temperatures whereupon the elastomer is cured to a hard resinous material.

---

This invention was made in the performance of work under an NASA contract and is subject to the provisions of Section 305 of the National Aeronautics and Space Act of 1958, Public Law 85–568 (72 Stat. 435; 42 U.S.C. 2457).

The present application is a continuation-in-part of presently pending application, Ser. No. 499,028, filed Oct. 20, 1965, entitled "Cyclized Polydiene Urethane Resins and Method of Manufacture," now abandoned.

For many applications, it is desirable to provide thermosetting plastics which have a high hydrocarbon content in addition to thermal stability, high strength modulus (stiffness), and workability in the precured state. The high hydrocarbon content contributes to humidity resistance which is important in the case, for example, of machine elements such as gears which must retain their dimensional stability in humid environments. In addition, the thermosetting plastic of the present invention has been used successfully as a matrix for glass reinforced laminates having improved thermal and chemical stability and humidity resistance.

The most common thermosetting resins such as the phenolics, polyesters, epoxides and urethanes normally contain only about 80 to 85% by weight of hydrocarbons and in addition other constituents which tend to make the resins hydrophilic and reduce their resistance to conditions of high humidity. On the other hand, the resins composed completely of hydrocarbons, such as polyethylene, polystyrene, polypropylene, and polystyrene-butadiene copolymers, are thermoplastic. Chemical cross-linking of these thermoplastic materials to provide thermosetting molecules, even under extreme conditions, does not yield high modulus plastics. Some of the newer resins such as the polyphenylenes, although "stiff" without cross-linking, are extremely difficult to process.

One of the objects of the present invention is to provide a series of thermosetting resins which have a high hydrocarbon content and are resistant to humidity.

Another object of the invention is to provide a predominantly hydrocarbon resin having high strength modulus.

It is another object of the invention to provide a thermosetting polydiene resin characterized mainly by a fused alicyclic structure.

It is a still further object of the invention to provide a thermosetting resin having a rubbery precursor which is formable by casting process techniques.

A still further object of the invention is to provide a novel process for producing a thermosetting resin of a cyclized polydiene urethane structure which process does not require severe reaction conditions.

Another object of the present invention is to provide compositions which are suitable for use as laminating materials and as adhesives.

Another object is to provide thermosetting resins of high thermal stability.

A further object is to provide lightweight thermosetting resins.

Another object is to provide resins which are chemically stable, particularly against oxidation.

It is a still further object of the invention to provide a coating composition which may be applied in a liquid form to a substrate, which composition upon curing forms an exceedingly tough, chemically and thermically stable resin film.

The thermosetting cyclized polydiene resin of the invention is comprised of mainly cross-linked, linearly-extended chains of fused substituted or unsubstituted cyclohexane groups. These fused substituted or unsubstituted cyclohexane groups are interconnected by chain extending chemical groups. The thermosetting polydiene resin is produced by a process involving reacting a chemically polyfunctional substituted polydiene prepolymer, characterized by an elongated carbon chain having pendant vinyl groups on alternate carbon atoms of the chain, with a polyfunctional organic chain extender which is capable of reacting with the functional groups of the polydiene to increase markedly the molecular weight through extension of the chain length. Cyclizing of the pendant vinyl groups into fused cycloaliphatic groups and cross-linking of adjacent chains are promoted by a peroxide free radical initiator. The hydrocarbon content of the resins is at least 90%, generally in excess of 93%, and typically on the order of 96%.

Preferably, the functional substituted groups of the polydiene prepolymer are positioned at the terminal ends of the prepolymer. While difunctional materials characterized by terminal substitution are preferred, other polyfunctional prepolymers having, for example, one terminal group and a second group located away from the other end of the prepolymer may be employed. The preferred polydienic prepolymer is a 1,2-polybutadienediol having hydroxyl substituents positioned at the terminal ends of the prepolymer. The prepolymer desirably has a molecular weight from about 500 to 3000. The polydiene prepolymer may be a 3,4-polyisoprene material such as 3,4-polyisoprenediol. The polyfunctional substituted polydiene prepolymer is preferably a dihydroxy material but may be, for example, a dicarboxyl substituted compound, a diamine substituted compound, or other polydienic prepolymer having chemically functional groups preferably terminally positioned.

The 1,2-isomeric form of the polybutadienediol may be prepared by anionic polymerization of conventional 1,3-butadiene. In a typical reaction system, an alkali metal, e.g., lithium or sodium, is dispersed with the butadiene in a polar solvent such as tetrahydrofuran. The butadiene undergoes a 1,2 polymerization to produce a polyaliphatic hydrocarbon terminated by the alkali metals. The resulting polymer is characterized mainly by an elongated carbon chain having pendant vinyl groups on alternate carbon atoms of the chain. The polymer is then reacted with ethylene oxide, or other suitable organic oxides, and subsequently acidified to provide the 1,2-polybutadienediol prepolymer. Alternatively, the polymer may be reacted with oxygen and subsequently acidified to provide the 1,2-polybutadienediol prepolymer. The prepolymer is isolated by evaporation of the solvent. However, for many purposes, it may not be necessary to remove the solvent at this stage. The polymerization reaction is carried out in an atmosphere free of oxygen or water vapor employing temperatures in the range of —80° C. to about —20° C. The addition of ethylene oxide is carried out at temperatures on the order of about —50° C.

The 1,2-isomeric form of the polybutadiene dicarboxylic acid prepolymer may also be prepared by anionic polymerization of conventional 1,3-butadiene. In a typical reaction system, an alkali metal, e.g., lithium or sodium, is dispersed with the butadiene in a polar solvent such as tetrahydrofuran. The butadiene undergoes a 1,2-polymerization to produce a polyaliphatic hydrocarbon terminated by the alkali metals. The resulting polymer is characterized mainly by an elongated carbon chain having pendant vinyl groups on alternate carbon atoms of the chain. The polymer is then reacted with carbon dioxide and subsequently acidified to provide the 1,2-polybutadiene dicarboxylic acid prepolymer.

The polydiene prepolymer used in the production of the thermosetting resin of the invention should be predominantly of the 1,2 configuration and desirably has at least 80% of the polymer structure with a 1,2 configuration. A polydiene starting material made up predominantly of a polymer resulting from a 1,4 polymerization is not satisfactory for use in the method of the invention. Preferably, the polymer micro-structure comprises at least 90° of the 1,2 configuration. A polydiene prepolymer containing an excessive amount of the 1,4 polymer configuration will give a thermosetting resin which does not have the desirable physical and chemical properties of resins of this invention. Generally the polydiene prepolymers suitable for the purposes of this invention do not dry or harden oxidatively in air at room or moderately elevated temperatures.

The polydiene prepolymer is reacted with the polyfunctional organic chain extender and a peroxide initiator, after thorough mixing, desirably followed by degassing. In the instance of a dihydroxy polydiene prepolymer and diisocyanate chain extender, the chain extending reaction proceeds at room temperature or moderately elevated temperatures to produce a rubber intermediate compound characterized in having the peroxide free radical initiator molecularly dispersed throughout. Heating of the rubber intermediary to temperatures of about 70° C. to 140° C. promotes cyclizing of the vinyl groups of the prepolymer chains to form condensed (substituted or unsubstituted) cyclohexane rings and cross-linking of adjacent chains. It will be appreciated that the diisocyanate markedly increases the molecular weight of the prepolymer through formation of polyurethane bonds.

The conditions set forth in the preceding paragraph are typical for the process of the invention employing a dihydroxypolydiene prepolymer and a diisocyanate chain extender. It will be appreciated that the conditions will vary with the materials used for production of the thermosetting polydiene resin and that these conditions may be readily determined by one skilled in the art. In the foregoing example employing a diisocyanate and a dihydroxy polydiene prepolymer, the first chain extending reaction occurs at room temperature and is followed by the second cyclizing and cross-linking reaction occurring at a somewhat higher temperature. Rapid heating of the reactants to elevated temperatures may cause the two reactions to occur substantially simultaneously. For the purposes of this invention the stepwise cure is preferred.

The organic chain extender is normally a difunctional material but may contain more than two functional groups. The preferred polyfunctional organic chain extender when used with a dihydroxy polydiene prepolymer such as 1,2-polybutadienediol is an organic diisocyanate material which in the process of the invention reacts at a moderately low temperature to form polyurethane bonds to increase markedly the molecular weight of the prepolymer.

Typical diisocyanate compounds which may be used in the process of the invention include:

TABLE I 2,4-toluene diisocyanate
Hexamethylene diisocyanate
2,6-toluene diisocyanate
Dianisidine diisocyanate
1,4-benzene diisocyanate
p,p'-diisocyanate diphenyl methane
1-chlorophenyl-2,4-diisocyanate
Trimethylene diisocyanate
Pentamethylene diisocyanate
Butylene-1,2-diisocyanate
Butylene-1,4-diisocyanate
Xylene diisocyanate
2,4-cyclohexylene diisocyanate
1,1-dibutyl ether diisocyanate
1,6-cyclopentane diisocyanate
2,5-indene diisocyanate
Diphenylmethane diisocyanate
1,5-naphthalene diisocyanate
Triphenylmethane diisocyanate The urethane bond formed in the chain extension of dihydroxy polydiene prepolymers employing diisocyanates is desirable in that there is no formation of a condensation product such as water or ammonia. The absence of a volatile condensation product makes the reaction particularly useful in the formation of an adhesive bond, laminates and compact resin masses. Additionally, the diisocyanate-dihydroxy polydiene prepolymer mixture is castable and upon reaction which occurs at a moderately low temperature, produces a long shelf-life, tack-free, rubbery material. The urethane rubber resulting from the diisocyanate reaction has a peroxide free radical initiator molecularly dispersed throughout, which initiator is required for the cyclizing and cross-linking reaction to produce the hard thermosetting resin.

There are other possible combinations of chain extension compounds polydiene prepolymer which can produce resins equivalent to those obtained from the diisocyanates-dihydroxy polydiene prepolymer combinations. For instance, reaction of the dihydroxy polydiene prepolymer with dicarboxylic acids, diacid halides, diesters, anhydrides and dianhydrides will produce a resin capable of cyclization that has been chain extended through polyester groups. The use of dicarboxylic acids, diacid halides, and diesters for chain extension results in the formation of chemical byproducts which may be volatile, thereby making these particular combinations less desirable for many applications. Dianhydrides are preferably because chain extension is effected without formation of chemical byproducts.

Other possible combinations of reactants can produce cyclized, cross-linked polydiene resins in addition to those utilizing the dihydroxy polydiene prepolymers. For example, polydiene dicarboxylic acid prepolymers having pendant vinyl groups on alternate carbon atoms on the backbone can be chain extended with a variety of compounds such a diols, diamines, diisocyanates, diepoxides, diimines and diimides. Polydiene dicarboxylic acids chain extended with diepoxides, diimines and diimides are preferred for the purposes of this invention because chemical byproducts are not formed in the reaction. Typical polydiene dicarboxylic acids include the 1,2-polybutadiene dicarboxylic acid and the 3,4-polyisoprene dicarboxylic acid structures. It will be appreciated that other derivatives of the dicarboxylic acid polydienes, can be used such as diacid halides, polyanhydrides, and diesters and suitable chain extenders will yield equivalent chain extended thermosetting polydiene resins.

Analogous useful resins which can produce cyclized polydiene polymers can be prepared from polyfunctional polydiene amines. For example, compounds which consist of 1,2-polybutadiene or 3,4-polyisoprene structures that have terminal amine groups may be chain extended by a number of difunctional and polyfunctional chain extenders. Typical diamine chain extenders that provide products that are useful for the purposes of this invention are diisocyanates, anhydrides, dianhydrides, dicarboxylic acids, diacid chlorides, diesters and diepoxides. It will be appreciated that the chain extenders such as diisocyanates, dianhydrides and diepoxides which produce no secondary product are preferable for the purposes of this invention.

Among the acids and anhydride chain extenders that may be employed are:

TABLE II
(1) adipic acid
(2) fumaric acid
(3) 1,4-cyclohexanedicarboxylic acid
(4) terephthalic acid
(5) malonic acid
(6) trimer acid (Emery 316 2–D)
(7) dimer acid (Empl 1022 and 1018), Empol dimer acids by Emery Industries
(8) azelaic acid
(9) sebacic acid
(10) isophthalic acid
(11) endo-cis bicyclo (2.2.1)-5-heptene-2,3-dicarboxylic dianhydride
(12) succinic anhydride
(13) dodecenyl succinic anhydride
(14) tetrahydrophthalic anhydride
(15) hexahydrophthalic anhydride
(16) maleic anhydride
(17) phthalic anhydride
(18) glutaric anhydride
(19) 1,4,5,6,7,7-hexachlorobicyclo-[2.2.1]-5-heptene-2, 3-dicarboxylic anhydride
(20) tetrachlorophthalic anhydride Suitable dianhydrides and polyanhydride chain extenders include the following:

TABLE III
(1) 3,3',4,4'-benzophenone tetracarboxylic dianhydride
(2) polyazelaic polyanhydride
(3) pyromellitic dianhydride
(4) pyromellitic dianhydride-glycol adducts
(5) 1,2,3,4-cyclopentanetetracarboxylic dianhydride Suitable diepoxide chain extenders include the following:

TABLE IV
(1) epoxy novalacs
(2) bis-epoxydicyclopentyl ether of ethylene glycol
(3) epichlorohydrin/bis phenol A-type
(4) 1-epoxyethyl-3,4-epoxycyclohexane
(5) dicyclopentadiene dioxide
(6) limonene dioxide
(7) bis (2,3-epoxypropoxy)benzene
(8) vinylcyclohexane dioxide
(9) 3,4-epoxy-6-methylcyclohexylmethyl - 3,4 - epoxy - 6-methylcyclohexanecarboxylate
(10) zeaxanthin diepoxide
(11) 9,10-epoxy - 12 - hydroxyoctadecanoic acid, triester with glycerol.

Suitable diimine, diimide and triimide chain extenders include the following:

TABLE V
(1) 1,6-hexane, N,N' diethylenimine
(2) 1,6-hexane, N,N' dipropylenimine
(3) 1,7-heptane, N,N' diethylenimine
(4) 1,7-heptane, N,N' dipropylenimine
(5) 1,8-octane, N,N' diethylenimine
(6) 1,8-octane, N,N' dipropylenimine
(7) 1,3-di (carboxy-N-propylenimide) benzene
(8) 1,3,5-tri (carboxy-N-propylenimide) benzene
(9) 1,3-di (ethylene-N-1,2-butylimine) benzene In some applications, a catalyst may be supplied to accelerate the chain extension reaction. For example, in the formation of the urethane bond between the diisocyanate and the dihydroxypolydiene prepolymer it is sometimes desirable to provide a catalyst which promotes polyurethanation. Suitable catalysts to promote the formation of the chain extending bonds through the reactions of other compounds are well known in the art. Similarly, the conditions generally favoring the reactions involving other combinations of reactants are known. For example, the chain extension reaction occurring between a dicarboxylpolydiene prepolymer and a diimine organic chain extender will be usually carried out in the range of 20 to 90° C. and that of a dicarboxylpolydiene prepolymer and a diepoxide chain extender generally in the range of 50 to 120° C. Where the 1,2-polybutadiene or 3,4-polyisoprene structure carries terminal amine groups the reaction with a diisocyanate to form a polyurea chain extending linkage is carried out generally in the range of 0° to 50° C. In the instance where the 1,2-polybutadienediol or 3,4-polyisoprenediol is chain extended through an ester linkage through reaction with a dibasic acid, the reaction is typically carried out in the range of 80 to 135° C. A dianhydride chain extension with a dihydroxypolydiene prepolymer will proceed in temperature range approximately 20 to 30° C. lower than that of the dibasic acid reaction. A chain extension employing a diacid chloride reacting with a dihydroxypolydiene prepolymer will proceed in the general range of 40 to 100° C. It will be appreciated that the presence or absence of a catalyst will have a bearing upon the reaction conditions. The foregoing temperature ranges are provided to give only an indication of general conditions and are not intended to be limiting.

Organic or inorganic peroxide free radical initiators may be employed in the process of the invention. Typical organic peroxides which initiate cyclization of pendant vinyl groups of the prepolymer are listed in Table VI:

TABLE VI
(1) di-t-butyl peroxide
(2) 2,5-dimethyl-2,5-bis(tertiary butylperoxy) hexane
(3) n-butyl-4,4-bis(tertiary butylperoxy) valerate
(4) 2,5-dimethyl-2,5-bis(tertiary butylperoxy) hexyne-3
(5) tertiary-butyl perbenzoate
(6) dicumyl peroxide
(7) methyl ethyl ketone peroxide
(8) cumene hydroperoxide
(9) di-N-methyl-t-butyl percarbamate
(10) lauroyl peroxide
(11) acetyl peroxide
(12) decanoyl peroxide
(13) t-butyl peracetate
(14) t-butyl peroxyisobutyrate The overall reaction system for the preparation of the improved resins from a 1,2-polybutadienediol and 2,4-toluene diisocyanate is represented ideally by the following sequence of reactions:

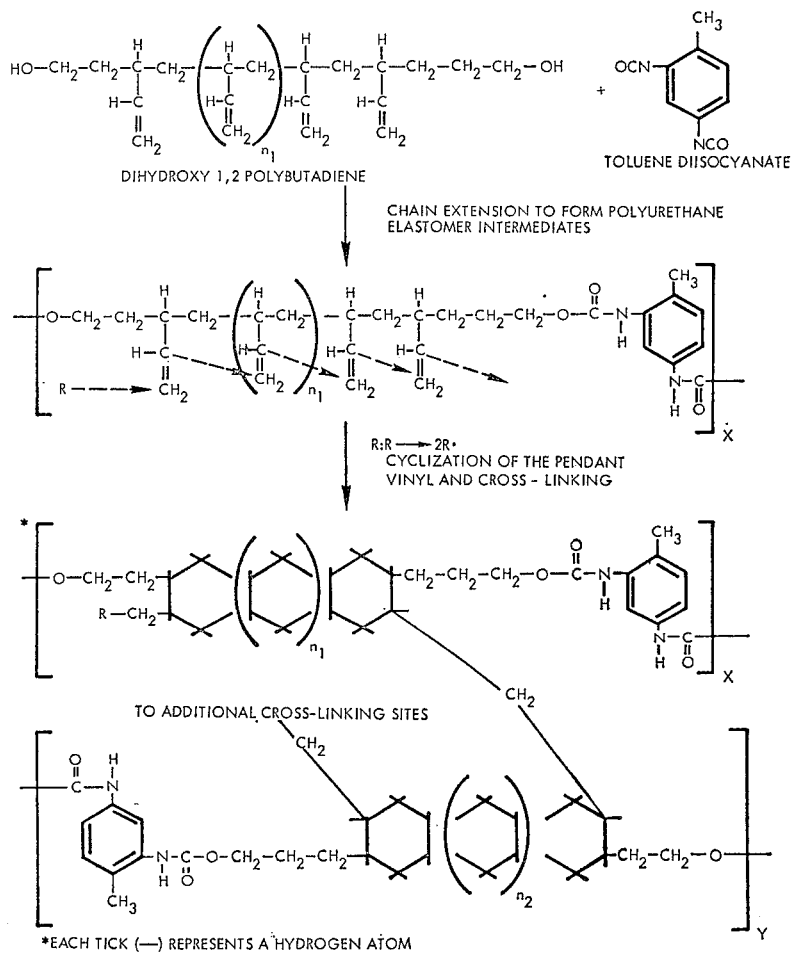

The first reaction is between the polybutadienediol and the diisocyanate to form a polyurethanated elastomer intermediate which has molecularly dispersed therein a peroxide free radical initiator. With the application of heat in the second reaction, the peroxide initiator decomposes to provide a free radical R which promotes cyclization of the pendant vinyl groups of the polydiene and cross-linking of adjacent chains. In the foregoing equations, $n$ typically represents an integer sufficiently high to provide an average molecular weight of about 500 to 3000 in the prepolymer, R is the residue of the active free radical initiator and $x$ and $y$ are sufficiently high integers to provide a solid, cross-linked product and typically will be in excess of 100.

The polydiene prepolymer and the organic chain extender are preferably reacted in substantially equimolar proportions. However, it will be appreciated that wide deviations from stoichiometry may be employed but generally this will result in a less desirable product. The peroxide free radical initiator is supplied in an amount adequate to promote cyclization of the pendant vinyl groups and cross-linking of adjacent chains. The peroxide is employed generally in an amount within the range of 0.5% to 10% by weight of the polymer and organic chain extender and preferably within the range of 2 to 6%.

It will be appreciated that larger and smaller amounts of the peroxide may be employed and that the optimum amount is dependent among other things such as the particular peroxide initiator used, the polydiene prepolymer employed, and the chain extender selected for the reaction.

The resin of the invention is particularly suitable for the formation of coatings on pipes, containers, and other materials exposed to high temperatures and corrosive chemicals. This class of resins has advantages over conventional protective plastic coatings because of the very good chemical resistance even to compounds such as nitrogen tetroxide, nitric acid, concentrated sulfuric acid, sodium hydroxide solution, acetic acid, halogenated hydrocarbons, acetone, and hydrocarbon solvents.

The following examples are presented to illustrate the various features of the invention and are not intended to be limiting.

Example I

Six hundred parts of a 1,2-polybutadienediol having an average molecular weight of 2000, and 12 parts of ditertiary butyl peroxide are placed in a glass vessel and mixed thoroughly. Sixty parts of toluene diisocyanate are then added to the vessel and the solution stirred until it becomes homogeneous. The solution is degassed in a vacuum chamber at an applied vacuum of about 1 millimeter of mercury for approximately 15 minutes. At the end of the degassing period, the material is poured into a mold and cured consecutively under the following sets of conditions: (1) ten days at 90° C. in air (2) six days at 110° C. in air (3) eight days at 115° C. in air (4) fifteen days at 170° C. in vacuum. The cured resins are clear, transparent, hard, and light yellow in color. A typical casting has the following physical properties:

Tensile strength: 5,500 p.s.i.
Hardness: Barcol No. 0f 40
Compressive strength: 38,400 p.s.i.
Compressive modulus: 225,000 p.s.i.
Density: 1.04 g./ml.
Specific heat: 0.34 cal./° C./g.
Thermal conductivity: $7.54 \times 10^{-4}$ cal./cm.$^2$/sec./° C.
Decomposition temperature: 457° C. (in $N_2$)
Weight loss in air at 300° C.: 0.079%/hr.
Dielectric strength: 1800 volts/mil.

Example II

Twenty parts of a 1,2-polybutadienediol having an average molecular weight of 2000 and 0.40 part of di-tertiary butyl peroxide is placed in a glass vessel and mixed thoroughly. Toluene diisocyanate is added in an amount of 1.88 parts and the solution stirred until homogeneous. Degassing and curing are carried out as in Example I. A light yellow, transparent plastic is obtained having a Barcol hardness of 35 to 45.

Example III

Twenty parts of a 1,2-polybutadienediol having an average molecular weight of 2000 and 0.40 part of di-tertiary butyl peroxide are placed in a glass vessel and thoroughly mixed. Hexamethylene diisocyanate is added in an amount of 1.60 parts and the solution stirred until homogeneous. Degassing and curing are carried out as in Example I. A light yellow, transparent plastic is produced having a Barcol hardness of 43, a specific heat of 0.365 cal./° C./g., and a decomposition temperature in nitrogen of 457° C.

Example IV

Twenty parts of a 1,2-polybutadienediol having an average molecular weight of 2000 and 0.40 part of di-tertiary butyl peroxide is placed in a glass vessel and mixed thoroughly. Bitolylene diisocyanate is added in an amount of 2.90 parts and the material is gently warmed and stirred until the diisocyanate is placed into solution. Degassing and curing is carried out as in Example I. A material similar to that described in Example I is obtained, having a Barcol number of 34, a specific heat of 0.346, and a decomposition temperature in nitrogen of 456° C.

Example V

Ten parts of a 1,2-polybutadienediol having a molecular weight of approximately 2000 is mixed with 0.2 part of 2,5-methyl-2,5-di(tertiary butyl peroxy) hexane in a glass vessel. To this solution is added 1.0 part of toluene diisocyanate and the materials are mixed until homogeneous. The resin mixture is processed as set forth in Example I to give a clear, transparent light yellow plastic with a Barcol hardness number of 42.

Example VI

Ten parts of a 1,2-polybutadienediol having a molecular weight of approximately 2000 are mixed with 0.2 part of tertiary butyl perbenzoate in a glass vessel. To this solution is added 1.0 part toluene diisocyanate and the materials mixed until homogeneous. The resin mixture is then processed as specified in Example I to obtain a clear, transparent light yellow plastic with a Barcol hardness number of 30.

Example VII

Thirty parts of a 1,2-polybutadienediol having an approximate molecular weight of 2000 are mixed with 0.6 part dicumyl peroxide in a glass vessel. Toluene diisocyanate is added to the above mixture in an amount of 3.0 parts. The materials are mixed in the glass vessel until a homogeneous solution results, and the solution is processed as specified in Example I to give a brown, translucent plastic having a Barcol hardness number of 25.

Example VIII

One hundred thirty-five parts of 3,4-polyisoprene glycol having an average molecular weight of 1350 and 2.7 parts of di-t-butyl peroxide are placed in a glass vessel and mixed thoroughly. Toluene diisocyanate is added in the amount of 18.8 parts and the solution stirred until homogeneous. The solution is degassed in a vacuum chamber at a pressure of about 1 mm. Hg for approximately five minutes. At the end of the degassing period, the material is poured into a mold and cured consecutively under these sets of conditions: (1) Eight days at 90° C. in air, (2) ten days at 115° C. in air, and (3) ten days at 170° C. in vacuum. The cured resins are clear, transparent, hard and yellow in color.

Example IX

Twenty parts of a 1,2-polybutadienediol having an average molecular weight of 2000 and 0.00002 part triethylenediamine are placed in a glass vessel and thoroughly mixed. The mixture is heated to 100° C. and stirred until the triethylenediamine dissolves in the prepolymer. The vessel is cooled to room temperature and 0.40 part di-t-butyl peroxide is mixed into the solution. Toluene diisocyanate is added in the amount of 1.88 parts and the solution is stirred until homogeneous. The solution is transferred to a mold, placed in a vacuum chamber, and degassed at a pressure of about 1 mm. Hg for approximately three minutes. The degassed material is cured consecutively under these sets of conditions: (1) two days at 90° C. in air, (2) ten days at 115° C. in air, and (3) five days at 170° C. in vacuum. The cured resins are clear, transparent, hard, and yellow in color.

Example X

Twenty parts of a 1,2-polybutadienediol having an average molecular weight of 2000 and 0.00002 part anhydrous p-toluene sulfonic acid are placed in a glass vessel and thoroughly mixed. The mixture is heated to 110° C. and stirred until homogeneous. The vessel is cooled to room temperature and 0.40 part di-t-butyl peroxide is mixed into the solution. Toluene diisocyanate is added in the amount of 1.88 parts and the solution is stirred until homogeneous. The solution is transferred to a mold, placed in a vacuum chamber, and degassed at a pressure of about 1 mm. Hg for approximately three minutes. The degassed material is cured consecutively under these sets of conditions: (1) two days at 90° C. in air, (2) ten days at 115° C. in air, and (3) five days at 170° C. in vacuum. The cured resins are clear, transparent, hard, and yellow in color.

Example XI

Twenty parts of a 1,2-polybutadienediol having an average molecular weight of 2000 and 0.00002 part ferric acetylacetonate are placed in a glass vessel and thoroughly mixed. To this mixture are added 0.4 part di-t-butyl peroxide and 1.88 parts toluene diisocyanate; the mixture is stirred until homogeneous. The material is transferred to a mold, placed in a vacuum chamber, and degassed at a pressure of about 1 mm. Hg for approximately three minutes. The degassed material is cured consecutively under these sets of conditions: (1) two days at 90° C. in air, (2) ten days at 115° C. in air, and (3) five days at 170° C. in vacuum. The cured resins are clear, transparent, hard, and brown in color.

Example XII

One hundred parts of a 1,2-polybutadienediol having an average molecular weight of 2000 and two parts of di-t-butyl peroxide are placed in a glass vessel and thoroughly mixed. Polymethylene polyphenylisocyanate is added in the amount of 14.6 parts and the solution is stirred until homogeneous. The solution is degassed in a vacuum chamber at a pressure of about 1 mm. Hg for approximately five minutes. At the end of the degassing period, the material is poured into a mold and cured consecutively under these sets of conditions: (1) seven days at 90° C. in air, (2) ten days at 115° C. in air, and (3) six days at 170° C. in vacuum. The cured resins are clear, transparent, hard, and yellow in color.

Example XIII

One hundred (100) parts of a 1,2-polybutadienediol having an average molecular weight of 2000 and 2 parts of di-t-butyl peroxide are placed in a glass vessel and mixed thoroughly. 3,3′,4,4′-benzophenone tetracarboxylic dianhydride is added in the amount of 17.4 parts and the solution stirred until homogeneous. The solution is degassed in a vacuum chamber at an applied vacuum of about 1 mm. Hg for approximately five minutes. At the end of the degassing period, the material is poured into a mold and cured consecutively under these sets of conditions: (1) six days at 90° C. in air, (2) five days at 115° C. in air, and (3) five days at 150° C. in air. The cured resin is hard, tough and dimensionally stable.

Example XIV

One hundred (100) parts of a 1,2-polybutadienediol having an average molecular weight of 2000 and 2 parts of di-t-butyl peroxide are placed in a glass vessel and mixed thoroughly. Pyromellitic dianhydride is added in the amount of 13.6 parts and the solution stirred until homogeneous. The solution is degassed in a vacuum chamber at an applied vacuum of about 1 mm. Hg for approximately ten minutes. At the end of the degassing period, the material is poured into a mold and cured consecutively under these sets of conditions: (1) six days at 90° C. in air, (2) five days at 115° C. in air, and (3) five days at 150° C. in air. The cured resin is hard, tough, and dimensionally stable.

Example XV

One hundred (100) parts of a carboxylic acid terminated 1,2-polybutadiene having an average molecular weight of 2000 and 2 parts di-t-butyl peroxide are placed in a glass vessel and mixed thoroughly, 3,4-epoxy-6-methylcyclohexylmethyl-3,4-epoxy-6-methylcyclohexanecarboxylate is added in the amount of 15.1 parts and stirred until homogeneous and the solution is degassed in a vacuum chamber at an applied vacuum of about 1 mm. Hg for approximately five minutes. At the end of the degassing period, the material is poured into a mold and cured consecutively under these sets of conditions: (1) four days at 90° C. in air, (2) five days at 115° C. in air, and (3) five days at 150° C. in air. The cured resin is hard, tough, and dimensionally stable.

Example XVI

One hundred parts of a carboxy terminated 1,2-polybutadiene having an average molecular weight of 2000, and two parts di-t-butyl peroxide are placed in a glass vessel and mixed thoroughly. Nine and one-quarter parts 1,6-hexane-N,N′-diethylenimine are quickly mixed into the vessel and the solution is stirred until homogeneous. The solution is degassed in a vacuum chamber at a pressure of about 1 mm. Hg for approximately five minutes. At the end of the degassing period, the material is poured into a mold and cured consecutively under these sets of conditions: (1) one day at 60° C. in air, (2) five days at 115° C. in air, and (3) five days at 150° C. in air. The cured resin is hard, tough, and dimensionally stable.

Example XVII

One hundred (100) parts of amine terminated 1,2-polybutadienediol having an average molecular weight of 2000 and 2 parts di-t-butyl peroxide are placed in a glass vessel and mixed thoroughly. Toluene diisocyanate is added in the amount of 9.4 parts and the solution stirred until homogeneous. The solution is degassed in a vacuum chamber at an applied vacuum of about 1 mm. Hg for approximately five minutes. At the end of the degassing period, the material is poured into a mold and cured under these sets of conditions: (1) six days at 50° C. in air, (2) five days at 115° C. in air, and (3) five days at 150° C. in air. The cured resin is hard, tough and dimensionally stable.

Example XVIII

One hundred (100) parts of an amine terminated 1,2-polybutadiene having an average molecular weight of 2000 and 2 parts of di-t-butyl peroxide are placed in a glass vessel and mixed thoroughly. 3,3′,4,4′-benzophenonetetracarboxylic dianhydride is added in the amount of 17.4 parts and the solution is degassed in a vacuum chamber at an applied vacuum of about 1 mm. Hg for approximately ten minutes. At the end of the degassing period, the material is poured into a mold and cured consecutively under these sets of conditions: (1) three days at 70° C. in air, (2) five days at 115° C. in air and (3) five days at 150° C. in air. The cured resin is hard, tough, and dimensionally stable.

The new resins are thermally stable at temperatures of 400° C., they are tough, resistant to impact, and exhibit a high modulus of elasticity. The thermally stable, "stiff" character of the new materials is attributed to the fused cyclic configuration of the polymer chain between chemical cross-links. In contrast, cross-linked polyolefins are characterized by "flexible," single, chemical bonds between cross-links thus yielding materials which are thermally less stable and dimensionally less stiff than the cyclized materials. The toughness and impact resistance properties of the new resins are attributed to the chain extension of the prepolymer to form high molecular weight polymers through polyurethane bonds which occur upon reaction of the prepolymer with the diisocyanate. All of these advantages are achieved at a relatively high hydrocarbon content.

It should be evident that various modifications can be made to the described embodiments without departing from the scope of the present invention as defined by the claims which follow:

1. A hard thermoset resin having a Barcol hardness of at least about 25 and which has good chemical resistance to nitrogen tetroxide, nitric acid, concentrated sulfuric acid, sodium hydroxide solution, acetic acid, halogenated hydrocarbon, acetone, and hydrocarbon solvents prepared by curing in the presence of an organic peroxide free radical initiator, the reaction product of (1) a polydiene having (i) polyfunctional groups selected from the group consisting of hydoxyl, carboxyl, and amino and (ii) a predominant amount of vinyl groups on alternate carbon atoms of the polydiene backbone and (2) an organic chain-extender capable of reacting with the functional groups of the polydiene.

2. A hard thermoset resin according to claim 1 wherein the polyfunctional polydiene is selected from the group consisting of 1,2-polybutadiene and 3,4-polyisoprene.

3. The resin of claim 1 wherein the chain-extender capable of reaction with the hydroxyl functional groups on the polydiene is selected from the group consisting of (a) diisocyanate substituted aliphatic compounds, (b) diisocyanate substituted aromatic compounds, (c) diacid halide substituted aliphatic compounds, (d) diacid halide substituted aromatic compounds, (e) dicarboxylic acid substituted aliphatic compounds, (f) dicarboxylic acid substituted aromatic compounds, (g) diester substituted aliphatic compounds, and (h) diester substituted aromatic compounds.

4. The resin of claim 1 wherein the chain-extender capable of reaction with the carboxyl functional groups on the polydiene is selected from the group consisting of (a) diepoxide substituted aliphatic compounds, (b) diepoxide substituted aromatic compounds, (c) diamine substituted aliphatic compounds, (d) diamine substituted aromatic compounds, (e) dihydroxyl substituted aliphatic compounds, (f) dihydroxyl substituted aromatic compounds, (g) diaziridine substituted aliphatic compounds, and (h) diaziridine substituted aromatic compounds.

5. The resin of claim 1 wherein the chain-extender capable of reaction with the amino functional groups on the polydiene is selected from the group consisting of (a) diisocyanate substituted aliphatic compounds, (b) diisocyanate substituted aromatic compounds, (c) anhydride substituted aliphatic compounds, (d) anhydride substituted aromatic compounds, (e) dianhydride substituted aliphatic compounds, (f) dianhydride substituted aromatic compounds, (g) dicarboxylic acid substituted aliphatic compounds, (h) dicarboxylic acid substituted aromatic compounds, (i) diacid halide substituted aliphatic compounds, (j) diacid halide substituted aromatic compounds, (k) diester substituted aliphatic compounds, (l) diester substituted aromatic compounds, (m) diepoxide substituted aliphatic compounds, and (n) diepoxide substituted aromatic compounds.

6. A thermosetting elastomeric polymer capable of being cured to produce a hard thermoset resin having a Barcol hardness of at least about 25 and which has good chemical resistance to nitrogen tetroxide, nitric acid, concentrated sulfuric acid, sodium hydroxide solution, acetic acid, halogenated hydrocarbons, acetone, and hydrocarbon solvents comprising:

(A) the reaction product of (1) a polydiene having (i) polyfunctional groups selected from the group consisting of hydroxyl, carboxyl, and amino and (ii) a predominant amount of vinyl groups on alternate carbon atoms on the polydiene backbone and (2) a polyfunctional organic chain-extender which is capable of reacting with the functional groups of the polydiene, and (B) molecularly dispersed through (A) a peroxide free radical initiator substantially unreacted.

7. A thermosetting elastomeric polymer according to claim 6 wherein the polydiene is selected from the group consisting of 1,2-polybutadiene and 3,4-polyisoprene.

8. The thermosetting elastomeric polymer of claim 6 wherein the chain extender is selected from the group consisting of (a) diisocyanate substituted aliphatic compounds, (b) diisocyanate substituted aromatic compounds, (c) diacid halide substituted aliphatic compounds, (d) diacid halide aromatic compounds, (e) dicarboxylic acid substituted aliphatic compounds, (f) dicarboxylic acid substituted aromatic compounds, (g) diester substituted aliphatic compounds, (h) diester substituted aromatic compounds, (i) diepoxide substituted aliphatic compounds, (j) diepoxide substituted aromatic compounds, (k) diamine substituted aliphatic compounds, (l) diamine substituted aromatic compounds, (m) dihydroxyl substituted aliphatic componds, (n) dihydroxyl subsituted aromatic compounds, (o) diaziridine substituted aliphatic compounds, and (p) diaziridine substituted aromatic compounds.

9. A method of producing a hard polydiene resin comprising:

reacting (A) a polydiene having (1) polyfunctional groups selected from the group consisting of hydroxyl, carboxyl, and amino and (2) a predominant amount of vinyl groups on alternate carbon atoms of the polydiene backbone with (B) a chain-extender capable of reacting with the functional groups on the polydiene at ambient temperature and in the presence of a peroxide free radical initiator to produce an elastomeric material having the peroxide molecularly dispersed therethrough substantially unreacted, and subsequently curing the elastomer to a hard thermoset resin having a Barcol hardness of at least 25.

10. A method of making a thermosetting polydiene resin according to claim 9 wherein the polydiene is selected from the class consisting of 1,2-polybutadiene and 3,4-polyisoprene.

11. A method according to claim 9 wherein the chain-extender capable of reaction with the hydroxyl functional groups on the polydiene is selected from the group consisting of (a) diisocyanate substituted aliphatic compounds, (b) diisocyanate substituted aromatic compounds, (c) diacid halide substituted aliphatic compounds, (d) diacid halide substituted aromatic compounds, (e) dicarboxylic acid substituted aliphatic compounds, (f) dicarboxylic acid substituted aromatic compounds, (g) diester substituted aliphatic compounds, and (h) diester substituted aromatic compounds.

12. A method according to claim 9 wherein the chain-extender capable of reaction with the carboxyl functional groups on the polydiene is selected from the group consisting of (a) diepoxide substituted aliphatic compounds, (b) diepoxide substituted aromatic compounds, (c) diamine substituted aliphatic compounds, (d) diamine substituted aromatic compounds, (e) dihydroxyl substituted aliphatic compounds, (f) dihydroxyl substituted aromatic compounds, (g) diaziridine substituted aliphatic compounds, and (h) diaziridine substituted aromatic compounds.

13. A method according to claim 9 wherein the chain-extender capable of reaction with the amino functional groups on the polydiene is selected from the group consisting of (a) diisocyanate substituted aliphatic compounds, (b) diisocyanate substituted aromatic compounds, (c) anhydride substituted aliphatic compounds, (d) anhydride substituted aromatic compounds, (e) dianhydride substituted aliphatic compounds, (f) dianhydride substituted aromatic compounds, (g) dicarboxylic acid substituted aliphatic compounds, (h) dicarboxylic acid substituted aromatic compounds, (i) diacid halide substituted aliphatic compounds, (j) diacid halide substituted aromatic compounds, (k) diester substituted aliphatic compounds, (l) diester substituted aromatic compounds, (m) diepoxide substituted aliphatic compounds, and (n) diepoxide substituted aromatic compounds.

References Cited

UNITED STATES PATENTS

| 2,439,514 | 4/1948 | Herndon | 154—136 |
| 2,877,212 | 3/1959 | Seligman | 260—77.5 |
| 2,968,647 | 1/1961 | Koenecke et al. | 260—77.5 |
| 3,055,952 | 9/1962 | Goldberg | 260—635 |
| 3,084,141 | 4/1963 | Kraus et al. | 260—85.1 |
| 3,135,716 | 6/1964 | Uraneck et al. | 260—93.5 |
| 3,147,313 | 9/1964 | Hsieh | 260—837 |
| 3,203,944 | 8/1965 | Hsieh | 260—94.7 |
| 3,285,949 | 11/1966 | Siebert | 260—77.5 |
| 3,338,861 | 8/1967 | Mastin | 260—33.6 |

FOREIGN PATENTS

| 589,950 | 12/1959 | Canada. |
| 676,047 | 12/1963 | Canada. |
| 677,255 | 12/1963 | Canada. |
| 957,788 | 5/1964 | Great Britain. |
| 1,315,354 | 12/1962 | France. |

OTHER REFERENCES

"Product Data Bulletin Number 505," published by Sinclair Petrochemicals, Inc., issued May 1, 1965 (46 pages).

DONALD E. CZAJA, *Primary Examiner.*

F. McKELVEY, *Assistant Examiner.*

U.S. Cl. X.R.

260—75, 77.5, 2, 78, 66; 117—161; 161—190; 156—331

PO-1050
(5/69)

UNITED STATES PATENT OFFICE
CERTIFICATE OF CORRECTION

Patent No. 3,431,235                Dated    March 4, 1969

Inventor(s) Hyman R. Lubowitz

It is certified that error appears in the above-identified patent and that said Letters Patent are hereby corrected as shown below:

Col. 3, line 48 change "90°" to read -- 90% --.

Col. 4, line 15 change "dinhydroxy" to read - - dihydroxy - -;

line 61 insert - - and - - after "compounds"; and line 72 change "preferably" to read - - preferable - -.

Col. 5, line 6 change "a" to - - as - -; and line 14 delete the comma.

Col. 6, line 44 insert - - a - - after "in".

Col. 8, line 3 change "such as" to - - upon - -.

Col. 12, line 51 change "hydoxyl" to - - hydroxyl - -.

Col. 13, line 54 change "subituted" to - - substituted - -.

SIGNED AND
SEALED
JUL 21 1970

(SEAL)
Attest:

Edward M. Fletcher, Jr.
Attesting Officer

WILLIAM E. SCHUYLER, JR.
Commissioner of Patents